United States Patent
Aguirre et al.

(10) Patent No.: US 7,978,632 B2
(45) Date of Patent: Jul. 12, 2011

(54) WIRELESS MESH NETWORK TRANSIT LINK TOPOLOGY OPTIMIZATION METHOD AND SYSTEM

(75) Inventors: Mariano Aguirre, Dallas, TX (US); Douglas W. M. MacIntosh, Ottawa (CA)

(73) Assignee: Nortel Networks Limited, Mississauga, Ontario (CA)

( * ) Notice: Subject to any disclaimer, the term of this patent is extended or adjusted under 35 U.S.C. 154(b) by 463 days.

(21) Appl. No.: 12/119,666

(22) Filed: May 13, 2008

(65) Prior Publication Data
US 2009/0285124 A1 Nov. 19, 2009

(51) Int. Cl.
*H04L 12/28* (2006.01)
(52) U.S. Cl. ......... 370/255; 370/229; 370/231; 370/351
(58) Field of Classification Search .................. None
See application file for complete search history.

(56) References Cited

U.S. PATENT DOCUMENTS
7,688,739 B2 * 3/2010 Frei et al. .................. 370/238
* cited by examiner

*Primary Examiner* — Ayaz R Sheikh
*Assistant Examiner* — Blanche Wong
(74) *Attorney, Agent, or Firm* — Christopher & Weisberg, P.A.

(57) ABSTRACT

A method and configuration manager generates a routing topology for a wireless mesh network. The wireless mesh network has a plurality of internal nodes, at least one edge node, and at least one originating device. A plurality of potential routing solutions is determined which contain a plurality of paths through the wireless mesh network from the at least one originating device to the at least one edge node such that data communicated from the at least one originating device reaches the at least one edge node in no more than a predetermined number of hops. Each potential routing solution is based on at least one measured wireless communication parameter between internal nodes. Metric calculations for each potential routing solution are computed to determine a preferred routing solution. The wireless mesh network is configured to route traffic using the preferred routing solution.

19 Claims, 5 Drawing Sheets

FIG. 6 ically to a method and system for optimizing routing paths in a communication network, and more specifically to a method and system for automatically generating an optimized backhaul routing topology in a wireless mesh network which allows data from each node to reach a network access point in an efficient number of hops.

WIRELESS MESH NETWORK TRANSIT LINK TOPOLOGY OPTIMIZATION METHOD AND SYSTEM

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to a method and system for optimizing routing paths in a communication network, and more specifically to a method and system for automatically generating an optimized backhaul routing topology in a wireless mesh network which allows data from each node to reach a network access point in an efficient number of hops.

BACKGROUND OF THE INVENTION

Mesh networking is one method used for routing data, voice and instructions between wireless access points ("AP") called nodes. A node is a connection point, either a redistribution point or an end point, for data transmission. The nodes typically communicate using a predetermined protocol such as the protocol defined by the Institute of Electrical and Electronics Engineers ("IEEE") standard 802.11, commonly called Wi-Fi. In general, a node has the ability to recognize neighboring nodes within its communication range, and receive and process or route transmissions from those neighboring nodes to other nodes. A primary characteristic of mesh networks is that there is no predetermined path for routing data transmissions. Instead, a node may route data to any other available node in the mesh network, with the goal ultimately being delivery of the data to a client, the Internet, or other wide-area or local-area network. The process of transmitting data between the internal (non-final destination) nodes is known as "backhaul" routing.

A mesh network that has all nodes directly connected to all other nodes is referred to as a "fully connected network." Because there is no set path, the network provides continuous connections by "hopping" from node to node until the destination is reached. However, if a path becomes broken or blocked, the network has the ability to compensate by reconfiguring the data path to bypass an unreachable node.

The number of wireless access points or nodes in a mesh network may be quite large. For example, a city mesh network may have 30-40 APs and each AP can have multiple transit links, i.e., paths, to other APs. It is not uncommon for each AP to have 3-6, or even more, transit links within the mesh network. While this redundancy creates a very reliable infrastructure for ensuring that data eventually passes through the network, the cost is that the shortest path is not always chosen and if a link has an impaired transmission rate with respect to other links in the path, the data is transmitted at a slower rate than could otherwise be achieved. A transmitting node does not have the ability to see further down the path than the next hop, so the data is not always routed according to the most optimal overall route.

Automatic implementations of backhaul routing on the Wi-Fi access points may not prevent nodes from taking unnecessary hops through the mesh network, resulting in nodes having to perform several, e.g., 4-7, hops before reaching a wired network connection. Additionally, some nodes physically located in the middle of mesh network may receive considerably more traffic than nodes located further toward the edge of the network, and the data flow stalls waiting for the node to become available. Thus, a bottleneck is created in the network when there could potentially be other nodes available to route the data traffic and relieve congestion. As a result, latency is increased and re-transmission of the data decreases throughput and capacity in a Wi-Fi mesh network.

One current solution is to manually create a "blocking list" whereby certain nodes are manually prohibited from routing data to other specific nodes. Engineers establishing the wireless mesh network monitor the data distribution patterns and experimentally determine routing paths by systematically blocking distribution to various nodes from other selected nodes in the network. Once completed, the blocking list is then distributed to the access points. Depending on the size of the wireless mesh network, this process can take several hours and does not necessarily yield the optimal routing configuration. For larger networks, an engineer can easily miss generating the most optimal solution.

Therefore, what is needed is a method and system for automatically generating an optimized backhaul routing topology in a wireless mesh network which allows data from each node to reach a network access point in a limited number of hops.

SUMMARY OF THE INVENTION

The present invention advantageously provides a method and configuration manager for system for automatically generating a backhaul routing topology for a wireless network. Generally, the present invention advantageously determines a preferred backhaul routing solution through a wireless mesh in a quick and efficient manner, allowing installation and configuration of wireless mesh networks without lengthy human intervention. Additionally, embodiments of the present invention ensure that the resulting routing topology meets predetermined connection criteria.

One aspect of the present invention provides a method for generating a routing topology for a wireless network. The wireless network includes a plurality of internal nodes, at least one edge node, and at least one originating device. A plurality of potential routing solutions is determined where each potential routing solution contains a plurality of paths through the wireless network from the at least one originating device to the at least one edge node such that data communicated from the at least one originating device reaches the at least one edge node in no more than a predetermined quantity of hops. Each potential routing solution based on at least one measured wireless communication parameter between internal nodes. Metric calculations for each potential routing solution are evaluated to determine a preferred routing solution. The wireless mesh network is configured to route traffic using the preferred routing solution.

In accordance with another aspect, the present invention provides a configuration manager for configuring a wireless mesh network. The wireless mesh network includes a plurality of internal nodes and at least one edge node. The configuration manager includes a wireless communication interface and a routing topology generator. The routing topology generator is communicatively coupled to the wireless communication interface. The wireless communication interface provides for wireless communication between the configuration manager and the plurality of internal nodes and for communication between the configuration manager and the at least one edge node. The routing topology generator determines a plurality of potential routing solutions for the wireless mesh network. Each potential routing solution contains a plurality of paths through the wireless mesh network from the at least one originating device to the at least one edge node such that data communicated from the at least one originating device reaches the at least one edge node in no more than a predetermined quantity of hops. Each potential routing solution is based on at least one measured wireless communication parameter between internal nodes. The routing topology generator also stores the plurality of potential routing solutions in an array and evaluates metric calculations for each potential routing solution to determine a preferred routing solution. The routing topology generator further configures the wireless mesh network to route traffic using the preferred routing solution.

In accordance with still another aspect, the present invention provides a wireless mesh network having at least one originating device. The network further includes a plurality of edge nodes and a plurality of internal nodes. Each edge node is communicatively coupled to at least one originating device. Each internal node communicatively coupled to at least one originating device and to at least one edge node of the plurality of edge nodes. The network further includes a plurality of paths through the wireless mesh network from the at least one originating device to at least one edge node of the plurality of edge nodes. The wireless mesh network is configured such that data communicated from the at least one originating device reaches the at least one edge node in no more than a predetermined quantity of hops and the plurality of paths are evenly distributed among the plurality of edge nodes.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Before describing in detail exemplary embodiments that are in accordance with the present invention, it is noted that the embodiments reside primarily in combinations of apparatus components and processing steps related to implementing a system and method for generating an optimized backhaul routing topology in a wireless mesh network which allows data from each node to reach a network access point in a limited number of hops. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. Additionally, as used herein and in the appended claims, the term "Zigbee" relates to a suite of high-level wireless communication protocols as defined by the Institute of Electrical and Electronics Engineers ("IEEE") standard 802.15.4. Further, "Wi-Fi" refers to the communications standard defined by IEEE 802.11. The term "WiMAX" means the communication protocols defined under IEEE 802.16. "Bluetooth" refers to the industrial specification for wireless personal area network ("PAN") communication developed by the Bluetooth Special Interest Group.

One aspect of the present invention advantageously provides a system for creating routing topology for the transit link backhaul of a wireless mesh network. By using the routing procedures of the present invention, all nodes of the wireless mesh network are reachable within a predetermined number of hops, e.g., three hops or less. Additionally, an embodiment of the present invention optimizes use of high-powered, symmetrical links to create a chain topology wherein each access point contains only two transit links. The present invention further advantageously provides an even distribution of wireless access points per wired network access point connection to the Internet or other wired network.

In one embodiment of the present invention, a routing topology generator receives wireless communication parameter information collected from wireless mesh network access points ("AP") concerning neighboring APs, including for example, Transit Link ("TL") Received Signal Strength Indicators ("RSSI") for both the uplink and the downlink channel between the AP and each neighboring AP. Other and/or additional wireless communication parameters can be used as well, depending on the network communication protocol(s) being used. The routing topology generator uses this information to generate an optimized backhaul routing topology where unwanted Transit Links are blocked. In accordance with one aspect, the present invention results in an optimized topology which allows all nodes to reach the network access points for a wired network in 3 hops or less using the transit links with the best overall RSSI power, thus reducing latency. The routing topology generator also minimizes the number of transit links per AP, e.g., two links whenever possible, which increases the throughput and capacity of the wireless mesh network. The routing topology generator generates a "blocking list" that can be automatically distributed to all the access points in the wireless mesh network.

Figure 1:
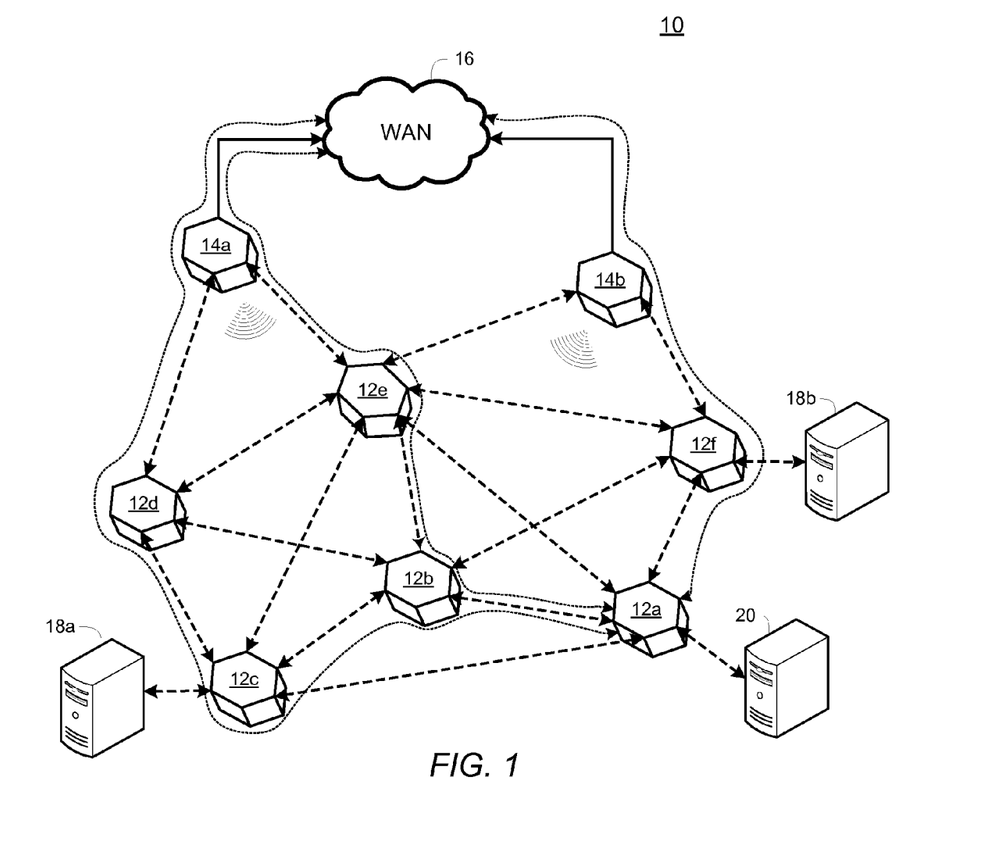
FIG. 1 is a block diagram of an automatically configurable wireless mesh network prior to optimization constructed in accordance with the principles of the present invention.

Referring now to the drawing figures in which like reference designators refer to like elements, there is shown in FIG. 1, a wireless mesh network constructed in accordance with the principles of the present invention, and designated generally as "10." Mesh network 10 includes an array of internal nodes 12a, 12b, 12c, 12d, 12e, 12f (referred to collectively as internal nodes 12). The internal nodes may be implemented as wireless access points. Each internal node 12 communicates with neighboring internal nodes 12 using radio frequency ("RF") signals encoded according to standard communication protocols, such Wi-Fi, Wi-MAX, Zigbee, Bluetooth, etc. Additionally, each internal node 12 includes an RSSI meter (not shown) for measuring the strength of the received RF signals.

The wireless mesh network 10 also includes at least two edge nodes 14a, 14b (referred to collectively as edge nodes 14). Each edge node 14 may be implemented as a network access point which receives wireless communications from the internal nodes 12 and is hard-wired a wide-area network 16 such as the Internet, intranet, or other communication network, including but not limited to a personal area networks ("PAN"), local area networks ("LAN"), campus area networks ("CAN"), metropolitan area networks ("MAN"), etc. Note that FIG. 1 displays wired connections as solid lines and wireless connections as dashed lines. Wireless mesh network 10 also includes a plurality of client computer devices 18a, 18b (referred to collectively as client computers 18) in communication with at least one internal node 12. Each client computer 18 may also be used as a configuration manager 20, which is used to optimize the backhaul routing topology for the mesh network 10 and is discussed in detail below. It should be noted that wireless mesh network 10 may include any number of client computers 18, internal nodes 12 and edge nodes 14. The amount of client computers 18, internal nodes 12 and edge nodes 14 shown in FIG. 1 is for illustrative purposes only and does not limit the scope of the present invention.

In the present embodiment, each client computer 18 has access to the wide-area network 16 via the internal nodes 12 and edge nodes 14. Data sent to or from each client computer 18 is directed to the wide-area network 16 by forwarding the information between internal nodes 12. Each internal node 12 may route the outgoing/incoming data to any neighboring internal node 12 en route to or from the client computer 18. For example, data sent from configuration manager 20 may progress, as indicated by the dotted lines of FIG. 1, from internal node 12a, to internal node 12b, to internal node 12c, to internal node 12d, before finally connecting to WAN 16 through wired edge node 14a, for a total of four hops. An alternate route may forward data from configuration manager 20 to internal node 12a, to internal node 12b, to internal node 12e, and then to wired edge node 14a, for a total of three hops. Another alternate route may route data from configuration manager 20 through internal node 12a, to internal node 12f and then to edge node 14b, for a total of two hops. Because each internal node 12 has access to all its neighboring internal nodes 12 in a web or mesh-like manner, there is no clear path from any one internal node 12 to the wide-area network 16. Note that the final destination may not necessarily be the WAN 16 and can be a device connected to any edge node 14.

Figure 2:
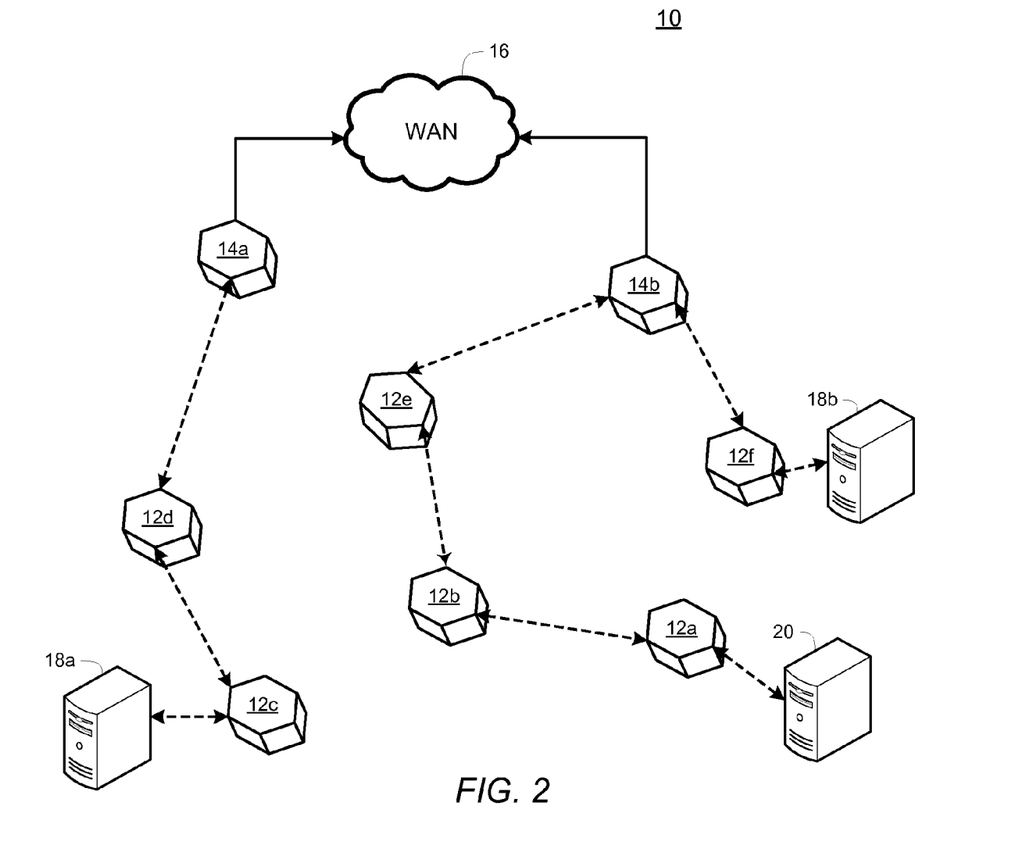
FIG. 2 is a block diagram of an optimized automatically configurable wireless mesh network based on the exemplary network of FIG. 1.

One embodiment of the present invention streamlines the structure of the wireless mesh network 10 by developing and assigning an optimal route to each internal node 12, as shown in FIG. 2. After the route optimization methods of the present invention are executed on the wireless mesh network of FIG. 1, the resultant configuration shown in FIG. 2 is established. As indicated, each client computer 18 may now access the wide-area network after only a maximum of three hops, and each internal node 12 has only two transit links (shown as dashed lines) between neighboring internal nodes 12, resulting in a chain-link topology.

Figure 3:
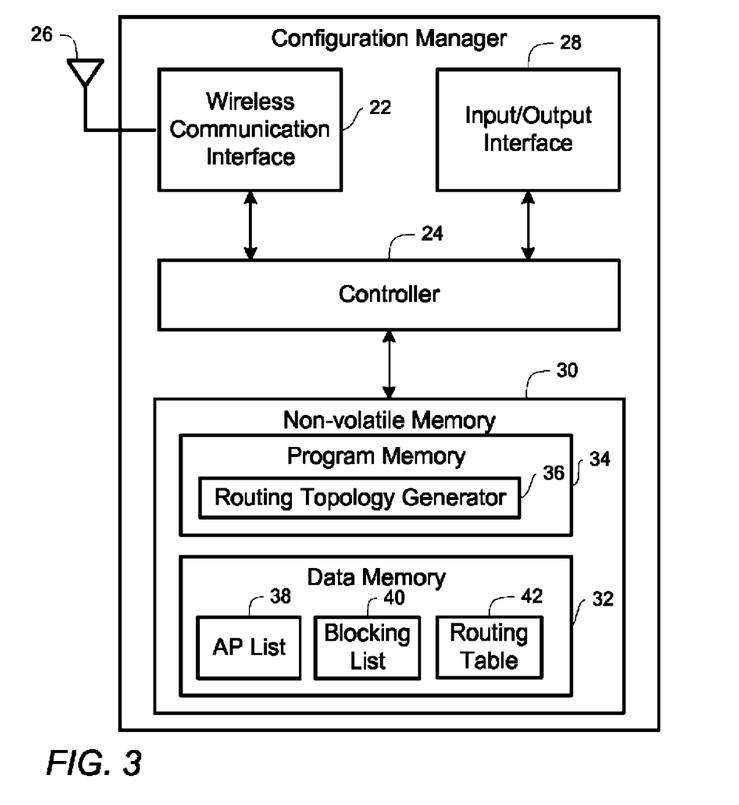
FIG. 3 is a block diagram of a configuration monitor constructed in accordance with the principles of the present invention.

Referring now to FIG. 3, an exemplary configuration manager 20 includes a wireless communication interface 22 communicatively coupled to a controller 24. The wireless communication interface 22 transmits and receives radio frequency signals through an antenna 26 in a well-known manner, e.g., using a Wi-Fi protocol. The controller 24 controls the processing of information and the operation of the configuration manager 20. The controller 24 is also coupled to an input/output interface 28 and a non-volatile memory 30. The input/output interface 28 controls the reception and presentation of information to and from a user through various well-known peripheral devices such as a display screen, a keyboard, a mouse, a printer, etc.

The non-volatile memory 30 includes a data memory 32 and a program memory 34. The program memory 34 contains a routing topology generator 36 which optimizes the backhaul routing topology of the wireless mesh network 10, the operation of which is discussed in more detail below. The data memory 32 stores data files such as an access point list 38 containing a listing of all the internal nodes 12 in the mesh network and corresponding RSSI values, a blocking list 40 generated by the routing topology generator 36 which contain names of neighboring internal nodes 12 prohibited from use by other specific internal nodes, a routing table 42 containing potential routing solutions, and various other user data files (not shown).

In one embodiment of the present invention, routing optimization is performed according to a two stage process. The first stage is generally a link elimination process which evaluates individual internal nodes 12 to find a potential routing solution that meets routing criteria. The second stage of the routing optimization process is a route selection process which evaluates the mesh network 10 as a whole. The route selection process repeats the link elimination process a predefined number of iterations to find a plurality of unique routing solutions and evaluates the effectiveness of each unique routing solution according to a set of performance metrics to find a preferred routing solution.

Figure 4:
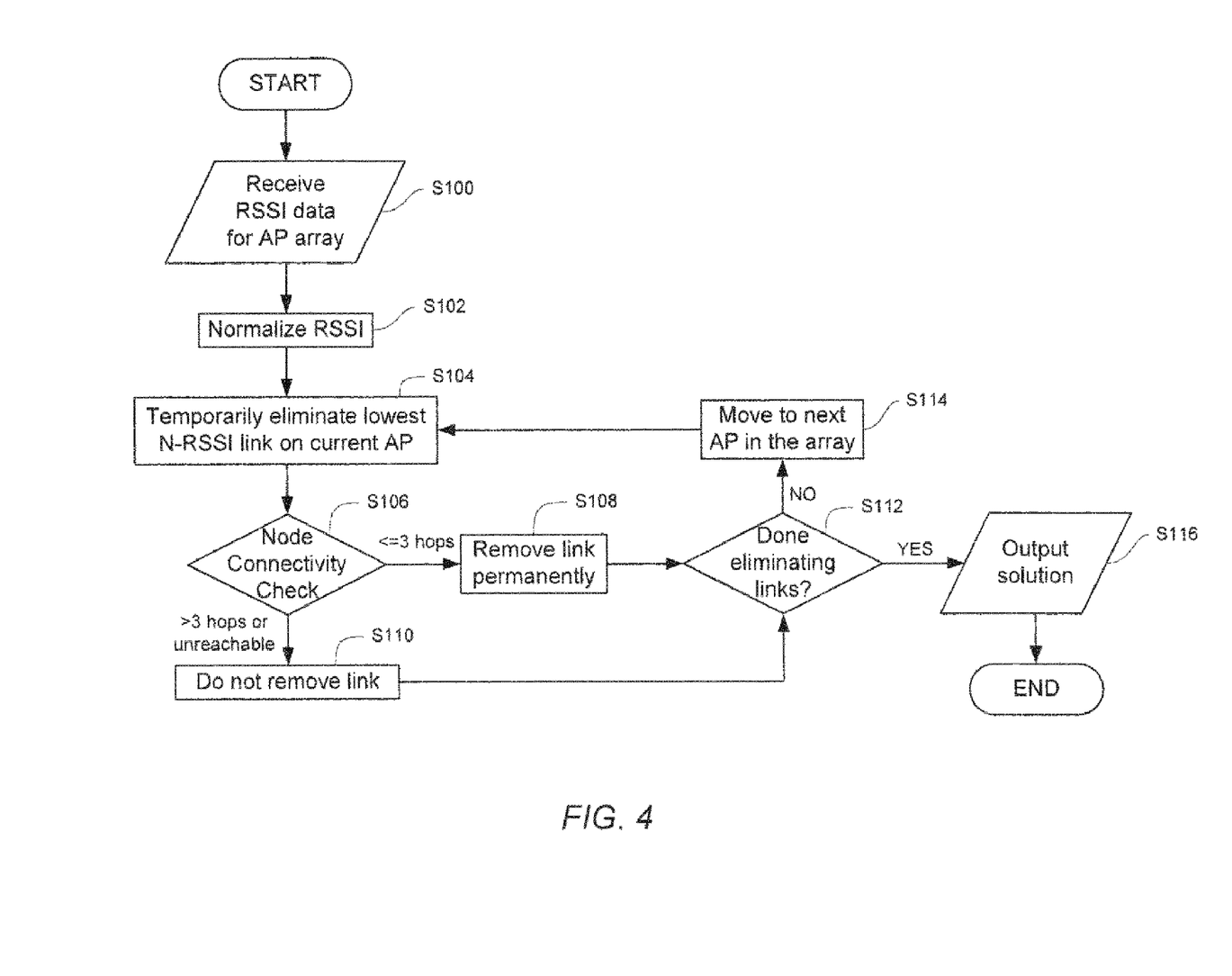
FIG. 4 is a flowchart of an exemplary link elimination process according to the principles of the present invention.

Referring now to FIG. 4, an exemplary operational flowchart is provided that describes steps performed by the routing topology generator 36 during the first stage of determining an optimal configuration for the wireless mesh network 10. During the link elimination stage, the routing topology generator 36 generates a single normalized RSSI value from forward and reverse link values which will be used to select best high power and symmetrical links, keeps all nodes reachable within 3 hops or less, and iteratively eliminates low power transit links from each internal node 12 until reaching the minimal topology.

Figure 5:
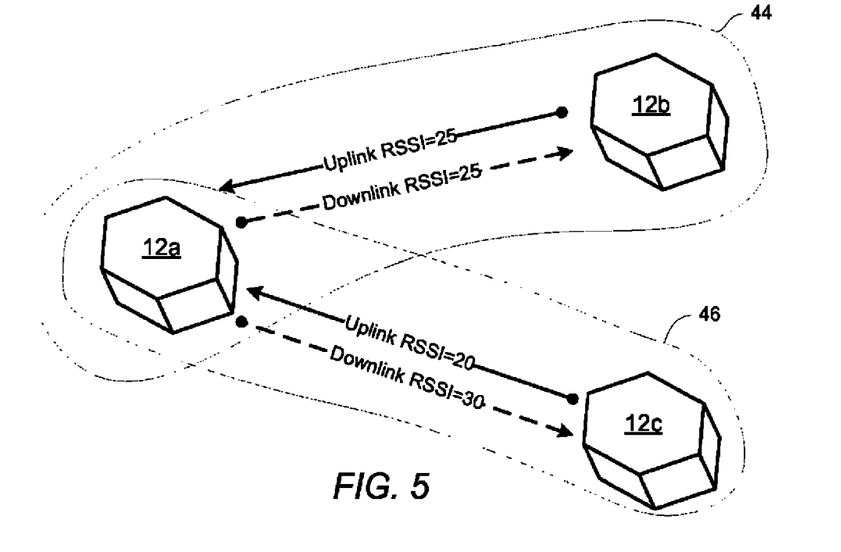
FIG. 5 is a block diagram of received signal strength indication ("RSSI") monitoring and optimization between nodes of a wireless mesh network constructed in accordance with the principles of the present invention.

The process begins when the routing topology generator 36 receives RSSI data for both the uplink and the downlink channel between each internal node 12 in the wireless mesh network 10 (step S100). The RSSI data indicates how strong the received signal is at its destination internal node 12. As shown in FIG. 5, the RSSI between internal nodes 12 is not always the same in the forward (uplink) direction as it is in the reverse (downlink) direction. Symmetrical links where the RSSI value for both forward and reverse links is the same provide better overall throughput than asymmetrical links. Since most links are not exactly symmetrical, a single normalization factor is used in order to select the best link out of many possible connections.

The routing topology generator 36 normalizes the RSSI value (step S102) by multiplying the RSSI value for the forward link by the RSSI value for the reverse link. This process results in a single normalized RSSI value which is inherently higher for symmetrical links than asymmetrical links which both links have the same average value. For example, turning once again to the links shown in FIG. 5, the link from internal node 12a to internal node 12b (link 44) has an RSSI of 25 in both the forward and reverse directions, whereas the link from internal node 12a to internal node 12b (link 46) has an RSSI of 20 in the forward direction and an RSSI of 30 in the reverse direction. Both links have an average RSSI of 25, however after applying the normalization factor, the normalized RSSI value for link 44 is 625 and the normalized RSSI value for link 45 is 600. The normalized RSSI allows the routing topology generator 36 to select the most symmetrical link, e.g., the links with the highest RSSI values are preferred.

The routing topology generator 36 iteratively analyzes each internal node 12 and eliminates the low power links until reaching a chain link topology or minimum topology that maintains connectivity of three hops or less. Each internal node 12 and corresponding RSSI values are stored in an access point list 38. Beginning with the first internal node 12 in the list 38, the routing topology generator 36 selects the link with lowest normalized RSSI value and temporarily removes the link from the internal node's known links (step S104). The node connectivity is checked (step S106) using a connectivity test algorithm based, for example, on a breadth-first graph search algorithm to verify that the network 10 is still valid. The network is still valid if an edge node 14 may be reached in three hops or less. Although the present invention is described using a predetermined maximum hop count of "3," it is understood that other pre-determined maximum hop values can be used. If the network is still valid, then the link is permanently removed (step S108). If the network is not valid, i.e., an edge node 14 cannot be reached or requires more than three hops, the link is not removed (step S110).

If there are more links to be evaluated (step S112), the routing topology generator 36 moves to the next internal node 12 in the list (step S114) and repeats steps S104 and S106, until all internal nodes 12 have a chain link configuration or no more links can be removed. Note that when the routing topology generator 36 reaches the end of the access point list 38, it returns to the top of the list, making the "next" internal node the first internal node on the list. When the routing topology generator 36 has completed eliminating links, it outputs a routing table 42 for each internal node based on a breadth-first graph search algorithm. The routing table 42 is created by finding the shortest hop path to the closest edge node 14 (step S116). Note that tree topology is maintained and stored in the case where an edge node 14 is not reachable within the predetermined number of hops, e.g., three hops or less.

The second stage of the routing optimization process is a route selection process which evaluates the mesh network 10 as a whole. In other words, the link elimination phase provides a single solution which may not necessarily be the optimal solution for routing the mesh network 10 because the solution produced in the first stage is dependent upon the order in which the internal nodes 12 are listed in the AP list 38. Because of the nature of these types of problems, it is possible for the link elimination phase to generate a different solution if the order of the internal nodes 12 is changed. The route selection process finds the most optimal solution by running multiple iterations of the link elimination process using a randomized internal node 12 order for each iteration. The route selection process further eliminates identical results, keeping only unique solutions and calculates metrics on each unique solution to determine the best possible configuration.

Figure 6:
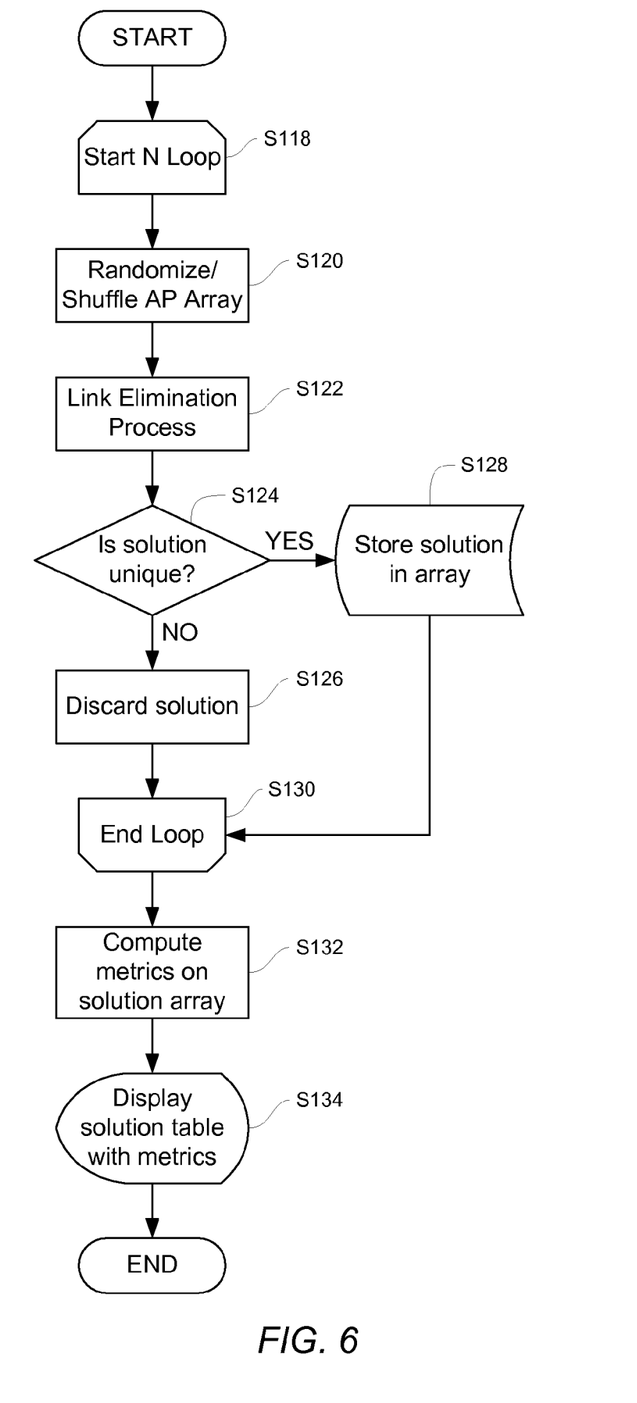
FIG. 6 is a flowchart of an exemplary routing selection process according to the principles of the present invention.

Referring now to FIG. 6, an exemplary operational flowchart is provided that describes steps performed by the routing topology generator 36 during the route selection stage of determining an optimal configuration for the wireless mesh network 10. The routing topology generator 36 performs a predetermined number of iterations ("N"), e.g., N=10,000 iterations, by entering a loop (step S118) which randomizes or shuffles the order in which the internal nodes 12 of the wireless mesh array are listed in the AP list 38 (step S120). The value for "N" can be selected by the system based on a default value or can be user-defined.

The link elimination process, described above in reference to FIG. 4, is performed for each version of AP list 38 (step S122) generating a separate routing table during each iteration which may be a potential routing solution. The solution generated during each iteration is compared to the existing stored solutions (step S124) to determine if the solution is unique. If the solution already exists, it is discarded (step S126) and the routing topology generator 36 loops back to perform the next iteration with a newly ordered AP list 38. If the solution is unique, it is stored in an array (step S128), along with the other unique solutions. The loop ends (step S130) when the user-defined number of iterations have been performed.

After all iterations are completed and each routing table is built, the routing topology generator 36 computes performance metrics on the solutions array (step S132) to determine the preferred solution. Exemplary metrics may include one or more of hop count metrics, node distribution metrics, and performance score metrics. Hop count metrics count the amount of internal nodes 12 that are one hop away from a network access point 14, two hops away, or three hops away. Node distribution metrics, for each routing solution, may include the average number of internal nodes 12 per edge node 14, the greatest number of internal nodes 12 assigned to any individual edge node 14, and the least number of internal nodes 12 assigned to any individual edge node 14.

An exemplary performance score metric is calculated by assigning each inter-connecting link between internal nodes 12 a probability factor based on the normalized RSSI value. The path probability from each internal node 12 to an edge node 14 is calculated based on each link probability. The routing table 42 is used to identify the path and internal nodes 12 involved. For example, for the mesh network shown in FIG. 1, one path from internal node 12a to edge node 14b is internal node 12a→internal node 12b→internal node 12e→edge node 14b. If the link probability of Link 12a-12b=P1, Link 12b-12e=P2, and Link 12e-14b=P3, then the path probability=P1×P2×P3. Once all path probabilities are calculated for each internal node 12, all path probabilities are added together and divided by the total number of internal node 12 in the mesh 10, i.e., averaged. The result is the performance score. Returning to FIG. 6, the solution with the highest performance score is selected and displayed to the user (step S134). The resulting solution may then be distributed to each internal node 12 in the mesh network 10 to configure the mesh network 10 for an optimal performance.

Use of the performance score to pick the best optimal solution out of the sub-optimal solutions calculated has a number of advantages. Solutions with stronger links will result in a higher score and 1-hop paths are automatically weighted higher than 2-hop and 3-hop paths. This has the advantage of making sure the solution with the highest score represents one that can carry backhaul traffic from edge nodes better since high power links are used. Used in combination with the node distribution metrics, an evenly distributed solution will have a higher performance score.

The present invention advantageously allows for the efficient installation and automatic configuration of a wireless mesh network in a very short amount of time. Additionally, wireless mesh networks installed and configured according to the principles of the present invention allow an even distribution of traffic through the mesh network while increasing efficiency and overall throughput.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for generating a routing topology for a wireless mesh network, the wireless mesh network having a plurality of internal nodes, at least one edge node, and at least one originating device, each internal node including at least one transit link having a forward direction and a reverse direction, the method comprising:
   determining a plurality of potential routing solutions containing a plurality of paths through the wireless mesh network from the at least one originating device to the at least one edge node such that data communicated from the at least one originating device reaches the at least one edge node in no more than a predetermined quantity of hops, each potential routing solution based on at least one measured wireless communication parameter between internal nodes, determining the plurality of potential routing solutions through the wireless mesh network including:
   creating an ordered list using a random arrangement of the internal nodes;
   performing a link elimination process using the ordered list to produce a routing solution; and
   responsive to determining that the routing solution is unique, storing the routing solution in an array;
   evaluating metric calculations for each potential routing solution to determine a preferred routing solution; and
   configuring the wireless mesh network to route traffic using the preferred routing solution; and
   the link elimination process including:
   a) receiving a received signal strength indication ("RSSI") value for both the forward direction and the reverse direction for each transit link of each internal node in the plurality of internal nodes;
   b) normalizing the RSSI values for each transit link to produce normalized RSSI values;
   c) temporarily eliminating the transit link having the lowest normalized RSSI value on the internal node;
   d) verifying that the internal node meets connectivity requirements;
   e) responsive to verifying that the internal node meets connectivity requirements, permanently eliminating the transit link; and
   f) repeating steps c) through e) for each internal node according an order arranged by the ordered list until no transit links remain eligible for elimination.

2. The method of claim 1, wherein the preferred routing solution establishes a predetermined quantity of transit links for each internal node.

3. The method of claim 1, wherein each internal node is a wireless access point.

4. The method of claim 1, wherein normalizing the RSSI values for each transit link includes multiplying the RSSI value for the forward direction by the RSSI value for the reverse direction.

5. The method of claim 1, wherein the connectivity requirements include:
   each internal node includes only two transit links; and
   data communicated from at least one client computer reaches the at least one edge node in three hops or less.

6. The method of claim 1, wherein the metric calculations include at least one of hop count metrics, node distribution metrics, and performance score metrics.

7. The method of claim 6, wherein the hop count metrics include a quantity of internal nodes that are a given quantity of hops away from an edge node for each quantity of hops less than or equal to the predetermined quantity of hops.

8. The method of claim 7, wherein each amount of internal nodes that are a given quantity of hops away from an edge node for each quantity of hops less than or equal to the predetermined quantity of hops are weighted according to different weight values, wherein each corresponding weight value is greater for a lower quantity of hops.

9. The method of claim 6, wherein the node distribution metrics include at least one of an average number of internal nodes per edge node, a greatest number of internal nodes assigned to any individual edge node, and a least number of internal nodes assigned to any individual edge node.

10. The method of claim 6, wherein the performance score metrics are determined by:
    determining a path probability for each path in each potential routing solution;
    adding the path probabilities determined for each potential routing solution together to produce a total path probability for each potential routing solution; and
    dividing the total path probability for each potential routing solution by the amount of internal nodes in the potential routing solution.

11. The method of claim 1, wherein the wireless mesh network includes a plurality of edge nodes, the paths of the preferred routing solution are evenly distributed among the plurality of edge nodes.

12. A configuration manager for configuring a wireless mesh network, the wireless mesh network having a plurality of internal nodes and at least one edge node, each internal node including at least one transit link having a forward direction and a reverse direction, the configuration manager comprising:
    a wireless communication interface, the wireless communication interface facilitating wireless communication between the configuration manager and the plurality of internal nodes and for communication between the configuration manager and the at least one edge node; and a routing topology generator communicatively coupled to the wireless communication interface, the routing topology generator:
  determining a plurality of potential routing solutions containing a plurality of paths through the wireless mesh network from the at least one originating device to the at least one edge node such that data communicated from the at least one originating device reaches the at least one edge node in no more than a predetermined quantity of hops, each potential routing solution based on at least one measured wireless communication parameter between internal nodes, determining the plurality of potential routing solutions through the wireless mesh network including:
    creating an ordered list using a random arrangement of the internal nodes;
    performing a link elimination process using the ordered list to produce a potential routing solution; and
    responsive to determining that the potential routing solution is unique, storing the potential routing solution in an array;
  evaluating metric calculations for each potential routing solution to determine a preferred routing solution; and
  configuring the wireless mesh network to route traffic using the preferred routing solution; and
the link elimination process including:
  a) receiving a received signal strength indication ("RSSI") value for both the forward direction and the reverse direction for each transit link of each internal node in the plurality of internal nodes;
  b) normalizing the RSSI values for each transit link to produce normalized RSSI values;
  c) temporarily eliminating the transit link having the lowest normalized RSSI value on the internal node;
  d) verifying that the internal node meets connectivity requirements;
  e) responsive to verifying that the internal node meets connectivity requirements, permanently eliminating the transit link; and
  f) repeating steps c) through e) for each internal node according an order arranged by the ordered list until no transit links remain eligible for elimination.

13. A method of generating a routing topology in a wireless network having a plurality of internal nodes, at least one edge node, and at least one originating node, the method comprising:
  generating a normalized received signal strength indicator (RSSI) associated with each of a plurality of transit links of an internal node; and
  for each internal node, iteratively eliminating a transit link with a lowest normalized RSSI until a minimum topology is reached such that all edge nodes are reachable from any internal node within a predetermined number of hops.

14. The method of claim 13, wherein the normalized RSSI is obtained from a product of an uplink RSSI and a downlink RSSI.

15. The method of claim 13, wherein the predetermined number of hops is three or less.

16. The method of claim 13, wherein the transit links are iteratively eliminated for each internal node in an order of internal nodes determined by a random ordered list of internal nodes.

17. The method of claim 16, wherein a minimum topology is determined for each of a plurality of different lists of internal nodes ordered randomly.

18. The method of claim 17, wherein a performance metric is determined for each minimum topology and the minimum topology having a best performance metric is selected.

19. The method of claim 17, wherein a performance metric includes at least one of a number of internal nodes that are not more than one hop away from an edge node, an average number of internal nodes per edge node, a greatest number of internal nodes assigned to an edge node, a least number of internal modes assigned to an edge node.

* * * * *